Jan. 19, 1965    M. R. NEALE    3,166,080
VEHICLE ACCESSORIES
Filed Dec. 20, 1962    2 Sheets-Sheet 2

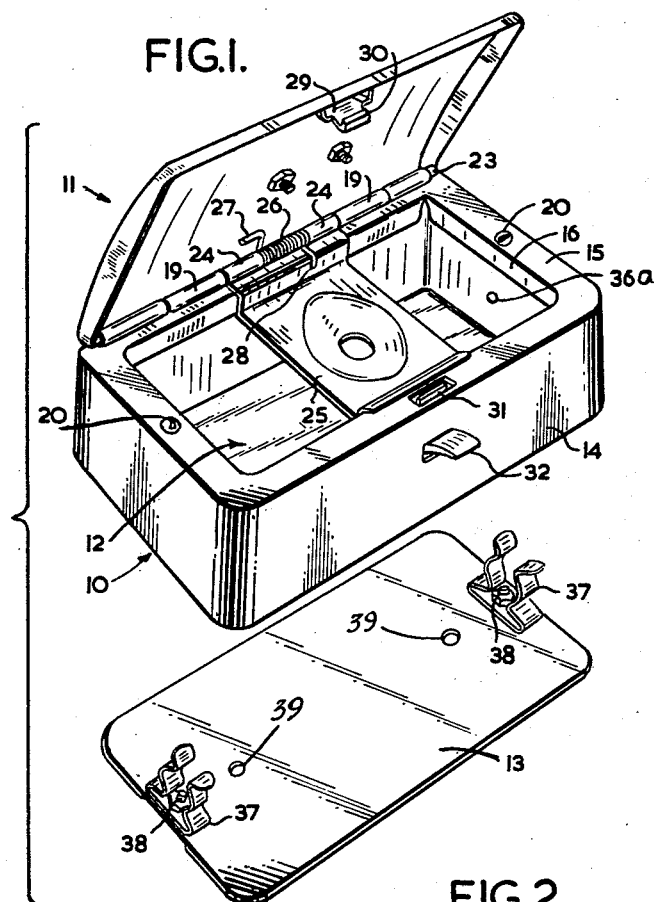
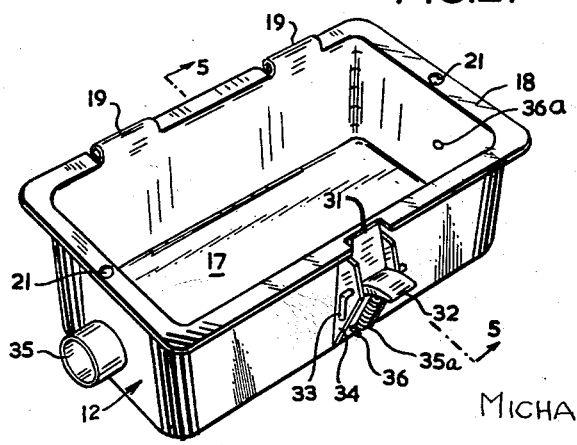

MICHAEL R. NEALE
INVENTOR
Harry Ernest Rubens
ATTORNEY 3,166,080
VEHICLE ACCESSORIES
Michael R. Neale, Old Hill, England, assignor to Raydyot Limited, Old Hill, England, a British company
Filed Dec. 20, 1962, Ser. No. 246,034
Claims priority, application Great Britain, Jan. 27, 1962, 3,195/62
6 Claims. (Cl. 131—241)

This invention relates to vehicle accessories, and particularly but not exclusively, ashtrays and like containers which are desirably fixed in the vehicle so as to be held against vibration or movement consequent upon the movement of the vehicle, but which can be readily removed for cleaning, refilling and the like.

In accordance with the invention, a vehicle accessory and mounting therefor, is provided, in which the accessory or the mounting has spring clips engaging projections on the mounting or the accessory as the case may be, so that the accessory can be readily removed and replaced.

One preferred embodiment of the invention is now described with reference to the accompanying drawings wherein:

FIGURE 1 is a perspective view of a motor vehicle ashtray shown separated from its mounting the ashtray and mounting being shown bracketed in the drawing:

FIGURE 2 is a perspective view of part of the ashtray;

Figure 3:
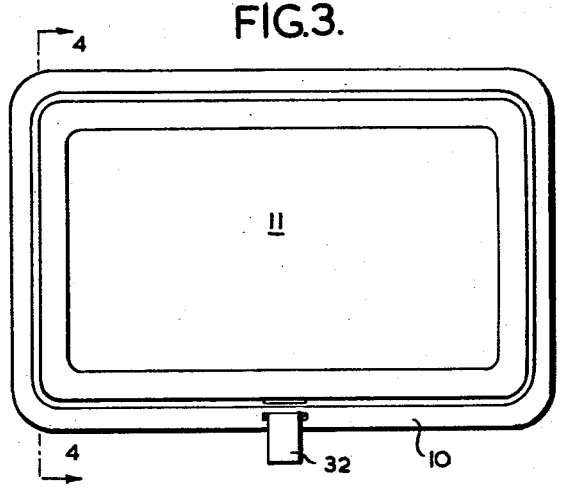
FIGURE 3 is a plan view of the complete ashtray.

The ashtray shown in the drawings comprises a body 10, a lid 11, an ashtray proper 12 and a mounting plate 13.

The body is substantially rectangular and comprises a surrounding skirt 14 and an inwardly projecting flange 15; the flange is turned over into the ashtray proper as at 16.

The ashtray proper 12 is shaped similarly to the body, but has a bottom 17 and an outward flange 18. The flange is extended to form a pair of hinge knuckles 19 which project through slots in the body flange 15, the two flanges being held together by screws 20 passing into tapped holes 21 in the ashtray flange 18.

The lid 11 also has a pair of knuckles adjacent and similar to those shown at 19 and a hinge pin or rod 23 extends through said knuckles, and through a pair of hinge knuckles 24 on a bridge piece 25. A torsion spring 26 is located between knuckles 24, and has tails 27, 28 abutting the lid and the bridge piece respectively. The spring urges the lid open and the bridge piece closed as shown in FIGURE 1.

Figure 5:
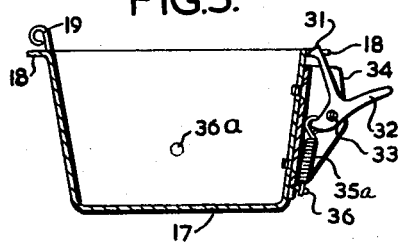
FIG. 5 is a section on the line 5—5 of FIGURE 2.

The lid also carries one member 29 of a catch mechanism and this member has a hooked end 30 for engagement with a complementary shaped end 31 of a release member 32 shaped as shown in FIGURES 2 and 5. Release member 32 is hinged upon a pin 33, which for ease of assembly is L-shaped, and is journalled in a pair of webs projecting from a bracket 34 fixed to the ashtray proper by screws. The release member is loaded by a spring 35a having its ends anchored to the member 32 and to a lug 36 struck out of the bracket. The position of the release member, when urged by the spring, is such that when the lid is closed the catch member 30 displaces the release member against the spring until the complementary parts engage, whereupon the spring tends to return the release member to hold the lid shut.

Said complementary shaped end 31 is located in slots in the two flanges 15, 18, and the free end of the release member projects through a window in the skirt 14 of the body.

Figure 4:
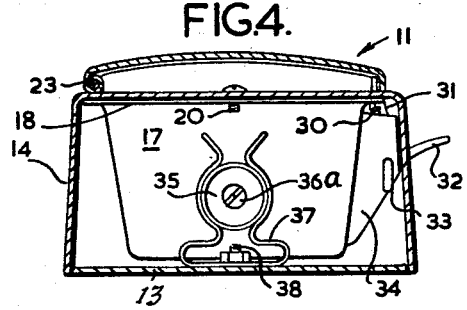
FIGURE 4 is a section on the line 4—4 of FIG. 3.

The ashtray proper carries a pair of projections in the form of cylindrical cups 35, in co-axial alignment, one on each shorter wall, and projecting into the space between the ashtray wall and the skirt (which forms a double-walled space). They are held in place by screws 36a. The mounting plate 13, FIGURES 1 and 4, carries a pair of substantially U-shaped spring clips 37 held in place by nuts and bolts 38. The clips have divergent end portions so that when the complete ashtray is lowered on to the mounting plate the clips may be engaged with the cups. The skirt 14 then surrounds the periphery of the plate 13.

The mounting plate has a pair of holes 39 for fastening it to, for example, the transmission tunnel of a motor vehicle, and when so fastened, the ashtray complete may be snap engaged and released as and when desired. This facilitates cleaning. Moreover, to open the lid, it is only necessary to press the release member, and the lid flies open, subsequently it can be snapped shut. The bridge is useful for resting a cigarette or the like, but can be hinged up against the spring for easy cleaning.

It will be appreciated that the ashtray could be made differently, for example with the ashtray-proper and body in one piece, and with the various screws replaced by rivets or spot welding if the parts are made of sheet metal, or even with the bracket moulded or cast with the ashtray. The essential features of the invention are defined in the accompanying claims.

I claim:

1. A vehicle accessory comprising a tray having a base, side and end walls and an open top, said tray being unitary with an outer shell comprising side and end walls, said side and end walls of said outer shell being parallel to and spaced from the side and end walls of said tray and surrounding the same, and a pair of projections carried by the tray and disposed between the end walls thereof and the end-walls of the outer shell, said accessory further comprising a mounting plate for permanent attachment to the vehicle, a pair of substantially U-shaped clips carried by the plate, said clips being spaced apart by a dimension equal to the length of the said tray between end-walls, said clips being resilient for making detachable connection between the projections of the tray to the clips of the plate.

2. A vehicle accessory comprising a tray and a mounting plate, said tray comprising side and end walls and a base and being open-topped, an outer shell comprising side and end walls surrounding said tray side and end walls and spaced therefrom, a flange projecting inwardly from the walls of the said outer shell, a flange projecting outwardly from the walls of the tray, said shell flange overlying the tray flange and being secured thereto, said flanges being located at the mouth of the tray, a pair of co-axial cups, one cup secured to each end wall of the tray, the cups being located between the end-walls of the tray and the end walls of the shell; said mounting plate comprising a plate adapted for permanent connection to the vehicle and being of dimensions to fit within the outer shell, a pair of spring clips, each spring clip being of substantially U-shape with the bridge of the U secured to said plate, said clips having out-turned end portions and a neck below said out-turned end portions to guide the said cups for snap-engagement with said clips.

3. A vehicle accessory comprising a tray and a mounting plate, said tray comprising side and end walls and a base and being open-topped, an outer shell comprising side and end walls surrounding said tray side and end walls and spaced therefrom, a flange projecting inwardly from the walls of the said outer shell, a flange projecting outwardly from the walls of the tray, said shell flange overlying the tray flange and being secured thereto, said flanges being located at the mouth of the tray, a pair of co-axial cups, one cup secured to each end wall of the tray, the cups being located between the end-walls of the tray and the end walls of the shell; said mounting plate comprising a plate adapted for permanent connection to the vehicle and being of dimensions to fit within the outer shell, a pair of spring clips, each spring clip being of substantially U-shape with the bridge of the U secured to said plate, said clips having out-turned end portions and a neck below said out-turned end portions to guide the said cups for snap-engagement with said clips, a lid, hinge means extending along one side of the tray, said lid being hinged upon said hinge means, a spring associated with said hinge means and urging the lid open, and catch means releasably holding the lid shut, said catch means being located between the outer shell and the wall of the tray.

4. A vehicle accessory comprising a tray and a mounting plate, said tray comprising side and end walls and a base and being open-topped, an outer shell comprising side and end walls surrounding said tray side and end walls and spaced therefrom, a flange projecting inwardly from the walls of the said outer shell, a flange projecting outwardly from the walls of the tray, said tray flange being interrupted at spaced positions, said shell flange overlying the tray flange and being secured thereto, said flanges being located at the mouth of the tray, a pair of co-axial cups, one cup secured to each end wall of the tray, the cups being located between the end-walls of the tray and the end walls of the shell; said mounting plate comprising a plate adapted for permanent connection to the vehicle and being of dimensions to fit within the outer shell, a pair of spring clips, each spring clip being of substantially U-shape with the bridge of the U secured to said plate, said clips having out-turned end portions and a neck below said out-turned end portions to guide the said cups for snap-engagement with said clips, hinge knuckles provided on said tray flange at said spaced positions, a lid having a peripheral flange, said lid flange being interrupted at spaced positions, hinge knuckles provided on said lid at said spaced positions, a hinge pin extending through all of said knuckles to hinge the lid to the tray, torsion spring wound about said lid urging said lid open, catch means located between the shell side wall and the tray side-wall on the opposite side of the tray to the said hinge knuckles, said catch means comprising an L-shaped member having a hook, pivoted between said tray and shell side-walls, and being spring loaded and an associated catch member provided on said lid for engagement with said hook.

5. A vehicle accessory comprising a tray having a base, side and end walls and an open top, said tray being unitary with an outer shell comprising side and end walls, said side and end walls of said outer shell being parallel to and spaced from the side and end walls of said tray and surrounding the same, and a pair of projections carried by the tray and disposed between the end walls thereof and the end-walls of the outer shell, a bracket carried by the tray and between the side walls thereof and the side walls of the shell, said accessory further comprising a mounting plate for permanent attachment to the vehicle, a pair of substantially U-shaped clips carried by the plate, said clips being spaced apart by a dimension equal to the length of the said tray between end-walls, said clips being resilient for making detachable connection of the tray to the base, a lid hinged to said tray, a catch release member having a hooked end and pivoted in said bracket, spring means urging said lid open, spring means urging said hooked end into engagement with said lid to hold the latter shut, and a bridge piece extending across said tray, hinged with the lid, and being urged into a position across the tray by said spring means urging said lid open.

6. A vehicle accessory comprising a tray and a mounting plate, said tray comprising side and end walls and a base and being open-topped, an outer shell comprising side and end walls surrounding said tray side and end walls and spaced therefrom one of said shell side-walls being apertured, a flange projecting inwardly from the walls of the said outer shell, a flange projecting outwardly from the walls of the tray, said flange being interrupted along opposite sides, said shell flange overlying the tray flange and being secured thereto, said flanges being located at the mouth of the tray, hinge knuckles provided on said tray and located at the positions of the interruptions along one side of the tray, a lid hinged upon a pin passing through said hinge knuckles, a pair of co-axial cups, one cup secured to each end wall of the tray, the cups being located between the end-walls of the tray at the end walls of the shell, a bracket disposed between the side-walls of the tray and shell and adjacent said shell aperture, a catch mechanism release member of L-shape pivoted to said bracket end having a hook end projecting through interruptions in the flanges on the side opposite to the lid hinge, the other end of the said release member projecting through said outer shell aperture, spring means urging said hook end towards the tray; said lid having a hook member for engagement with said hook end of the release member, a spring wound upon said hinge pin and urging the lid open, a bridge piece across said tray and hinged upon said hinge pin, said spring which urges the lid open urging the bridge piece downwardly, said bridge piece having a free end portion to overlap said flanges on the side opposite to the hinge, said mounting plate comprising a plate adapted for permanent connection to the vehicle and being of dimensions to fit within the outer shell, a pair of spring clips, each spring clip being of substantially U-shape with the bridge of the U secured to said plate, said clips having outturned end portions and a neck below said end portions to guide the said cups for snap-engagement with said clips.

References Cited by the Examiner
UNITED STATES PATENTS 1,992,421  2/35  Gottfried _____ 131—242

FOREIGN PATENTS 626,108  5/27  France.
719,742  11/31  France.
337,326  10/30  Great Britain.

ABRAHAM G. STONE, Primary Examiner.
JOSEPH S. REICH, Examiner.